Aug. 22, 1961    J. S. HARRIS    2,997,093
PUMPS
Filed Dec. 29, 1958
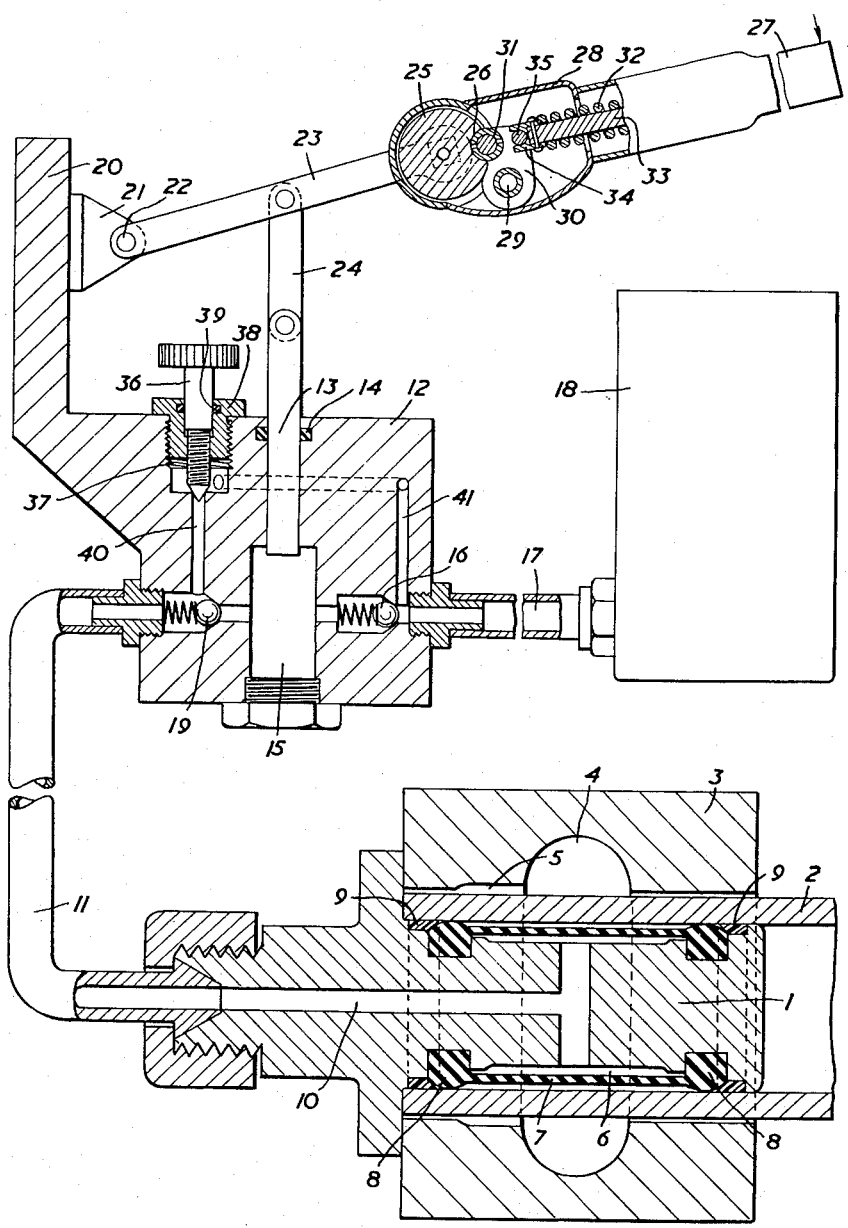
INVENTOR
JOHN STUART HARRIS
BY
Watson, Cole, Grindle & Watson
ATTORNEY United States Patent Office 2,997,093
Patented Aug. 22, 1961

2,997,093
PUMPS
John Stuart Harris, Allesley, Coventry, England, assignor to The Keelavite Company Limited, Allesley, Coventry, England, a company of Great Britain
Filed Dec. 29, 1958, Ser. No. 783,242
Claims priority, application Great Britain Jan. 10, 1958
7 Claims. (Cl. 153—79)

This invention relates to manually operated pumps and is concerned with the provision of means by which the output pressure of the pump may be controlled, the terms "manually" and "manual" used therein being understood to include foot operation.

According to the present invention a manually operated pump includes an operating member for manual operation which is connected to the pump mechanism through a mechanical connection arranged, when in a normal position, to transmit force to the pump mechanism but to yield when subjected during a pumping operation to a predetermined force or torque corresponding to a predetermined maximum pump pressure, and capable of being readily reset in its normal position after so yielding.

Thus, the operating member of the pump may be formed in two relatively movable sections connected to one another by a mechanical connection which includes a detent carried by one section and normally pressed by a spring into a recess in a part carried by the other section such that it will be forced out of the recess by the application of a predetermined force tending to move one section relatively to the other. Thus, the two sections are pivotally connected together by what is in effect a torque-limiting device.

The invention may be applied to apparatus for various purposes where it is desired to limit the maximum pressure at which a pump can deliver fluid, and may be particularly applicable to a hand pump employed for producing the fluid pressure in apparatus for forming one or more swellings adjacent to the end of a pipe by expanding it into one or more recesses in a surrounding part, and one embodiment of the invention as embodied in such apparatus is shown by way of example in the accompanying drawings, in which the essential working parts are shown in cross-section.

The apparatus shown in the drawings comprises a pressure-applying element including a generally cylindrical head 1 for insertion into the end portion of a pipe 2 in which a circumferential swelling is to be formed. The pipe end is for this purpose surrounded by a split former 3 having a bore within which the end portion of the pipe lies, and a circumferential recess 4 in such bore into which the appropriate part of the pipe 2 is to be expanded to form the swelling. The bore of the former 3 also includes a part 5 which is of somewhat greater diameter than the external diameter of the pipe 2 and into which part the appropriate portion of the pipe is also to be expanded in order to provide adjacent to the swelling a short section of pipe having a predetermined external diameter for cooperating with an O-ring or other seal when the pipe is removed from the apparatus shown and put into use.

The head 1 has formed on its external surface a shallow annular recess 6 lying within the parts of the former in which the recess 4 and the enlarged part 5 of the bore are formed, and, extending around this recess 6, is an impervious membrane 7 of rubber or like elastic material the ends of which membrane are provided with thickened sealing portions 8 which engage grooves in the head 1 and also engage the bore of the pipe 2 as shown. Buttress rings 9 formed, for example, of nylon are conveniently arranged in recesses in the head immediately on the outer sides of the sealing portions 8, these buttress rings having inclined surfaces which engage the sealing portions 8 so that the buttress rings 9 tend to be forced outwards into engagement with the bore of the pipe 9 by axial pressure applied to them by the portions 8 when liquid under pressure is delivered to the recess 6 through a passage 10 formed in the head.

The means for delivering liquid under pressure to and permitting its escape from the recess 6 comprises a hand pump connected by a pipe 11 to the passage 10. The hand pump comprises a body part 12 having formed therein a bore constituting a working cylinder in which is arranged to reciprocate a piston 13, which may be surrounded by an O-ring type seal 14 to ensure substantially fluid-tight operation within the bore. The end of the cylinder in which the piston 13 operates opens into a pressure chamber 15, which communicates through a spring-pressed non-return inlet valve 16 with a pipe 17 opening into a liquid reservoir 18, and through a spring-pressed non-return delivery valve 19 with the pipe 11. Thus, when the plunger 13 is reciprocated the pump will normally draw liquid from the reservoir 18 and deliver it through the pipe 11 to the passage 10 and recess 6.

Rigid with the body 12 of the pump is a support 20 carrying a bracket 21 to which is pivoted at 22 one end of a lever 23 an intermediate point in which is connected through a connecting link 24 with the piston 13. The end of the lever 23 remote from the pivot 22 is rigidly connected to a transverse spindle having an enlarged centre section or boss 25 thereon the circumference of which is of circular contour except for a part-cylindrical axially extending recess indicated at 26 which recess subtends an angle at the axis of its cylindrical surface of somewhat less than 180°. Pivotally connect to the end of the lever 23 adjacent to the boss 25, so as to be capable of oscillating about the axis of that boss is an arm 27 including a housing 28 at its inner end within which is pivotally mounted at 29 a lever 30 having rotatably mounted on it a roller 31 formed for engagement with the recess 26 as shown. A compression spring 32 surrounding a guide rod 33 acts through a fork 34 and a pin 35 on the lever 30 to press the roller 31 always into engagement with the boss 25.

The arrangement of the handle 27, boss 25 and the associated parts is of a known general kind commonly in use in so-called torque-limiting spanners for limiting the torque which can be applied to nuts or bolts when tightening them up, and it will be seen that, when the handle 27 is in its normal position in relation to the boss 25, that is to say with the roller 31 engaging the recess 26, oscillation of the handle 27 will oscillate the lever 23 and hence operate the plunger 13 to deliver liquid under pressure to the pipe 11, but that when the fluid pressure in the pipe 11 reaches some predetermined value the roller 31 will be forced from the recess 26 against the action of the spring 32 so that that predeterminated pressure cannot be exceeded. On return of the handle 27 to its normal position relatively to the lever 23 the roller 31 will re-enter the recess 26 and thus re-establish the force-transmitting but force-limiting connection between the lever 23 and the handle 27.

The pump body 12 has associated with it a pressure release valve comprising a manually operated needle valve, indicated at 36, the lower part 37 of which is in screw-threaded engagement with the lower part of the bore of a plug 38 while its upper part makes a fluid seal with the plug through a sealing ring 39. The valve when screwed down as shown is arranged to close communication between a passage 40 communicating with the pipe 11 and a passage 41 communicating with the pipe 17.

During operation of the pump to deliver liquid under pressure to the pipe 11 and passage 10 to cause the membrane 7 to force the appropriate parts of the pipe 2 outwards into the recess 4 and part 5 to provide the desired formation on the end of the pipe, the valve 36 is maintained closed as shown. After such forming operation the valve 36 is opened, whereupon the contraction of the elastic membrane 7 forces the liquid back along the passage 10, pipe 11, passages 40, 41 and pipe 17 into the reservoir 18 in readiness for withdrawal of the head 1 from the pipe 2 and removal of the former 3.

With the invention not only is the pressure which can be applied during a forming operation automatically limited to that necessary so that excessive work and waste of time is avoided, but this result is achieved without the operator having to have any particular skill and without resource to pressure gauges or similar instruments. Thus, to perform a forming operation the operator merely reciprocates the pump by means of the handle 27 until the roller 31 is forced from the recess 26 and the handle 27 thus rocks on the end of the lever 23 and he then knows that the forming operation is complete and that the pressure can be relieved by opening the valve 36 and the handle 27 reset in its normal position ready for a forming operation on the next pipe end.

What I claim as my invention and desire to secure by Letters Patent is:

1. Apparatus for forming swellings in the end portions of pipes comprising a head formed for insertion into the end portion of a pipe, and having longitudinally spaced parts which make fluid tight seals between portions of the head and the pipe, a female die part concentrically surrounding the said head and formed interiorly with a recess, a liquid delivery passage extending into the head and communicating with a space between such seals whereby liquid pressure delivered through said passage when the head is disposed in the end portion of a pipe can act to expand circumferential parts of the end portion of the pipe into said recess in the said female die part, and a pump arranged to deliver liquid pressure to the said passage in the head and comprising a body part, a movable fluid delivery member operating in said body part to deliver liquid under pressure to said passage in said head, and a manual operating handle for operation of said pump, which is connected to said movable fluid delivery member by a resettable releasable retaining mechanism which retains said manual operating handle in an operative position in which it is rigid wth said movable fluid delivery member and which releases said manual operating handle to allow free movement thereof when a swelling operation has been completed by the head, which prevents unnecessary rise in pressure in the delivery passage and provides positive indication of the completion of the operation to the operator.

2. Apparatus as claimed in claim 1 in which the said resettable releasable retaining mechanism comprises two relatively movable sections connected respectively to the fluid delivery member and the manual operating handle and connected to one another by a releasable mechanical connection which includes a detent carried by one section and normally pressed by a spring into a recess in a part carried by the other section such that it will be forced out of said recess by the application of a predetermined force tending to move one section relatively to the other.

3. Apparatus as claimed in claim 2 including a manually operated relief valve whereby after a forming operation, fluid can be permitted to escape from the passage in the head and return to a reservoir.

4. Apparatus as claimed in claim 3 in which said relief valve is carried by the body of the pump.

5. Apparatus as claimed in claim 2 in which the fluid delivery member is a reciprocating piston, and including a pivoted operating lever pivotally connected to the piston for operation of the latter, and connected to said manual operating handle through said resettable releasable retaining mechanism.

6. Apparatus as claimed in claim 5 including a manually operated relief valve whereby fluid can be permitted to escape from said passage in said head.

7. Apparatus as claimed in claim 6 in which said relief valve is carried by the body of the pump.

References Cited in the file of this patent
UNITED STATES PATENTS

| | | |
|---|---|---|
| 605,195 | Birtwisle | June 7, 1898 |
| 1,327,272 | Dellgren | Jan. 6, 1920 |
| 1,448,457 | Liddell | Mar. 13, 1923 |
| 1,702,047 | Fulton | Feb. 12, 1929 |
| 1,930,745 | Fisher | Oct. 17, 1933 |
| 1,958,509 | Carter | May 15, 1934 |
| 1,970,626 | Rockwell | Aug. 21, 1934 |
| 2,005,206 | Rockwell | June 18, 1935 |
| 2,037,434 | Pfauser | Apr. 14, 1936 |
| 2,299,492 | Pfauser | Oct. 20, 1942 |
| 2,375,763 | Blais | May 15, 1945 |
| 2,479,702 | Rood | Aug. 23, 1949 |
| 2,543,480 | Vaill | Feb. 27, 1959 |
| 2,893,465 | Mueller | July 7, 1959 |

FOREIGN PATENTS

| | | |
|---|---|---|
| 437,199 | Italy | June 26, 1948 |
| 700,052 | Great Britain | Nov. 25, 1953 |